US008726966B1

(12) United States Patent
Liao

(10) Patent No.: US 8,726,966 B1
(45) Date of Patent: May 20, 2014

(54) ADHESIVE SUBSTANCE REMOVING TOOL

(71) Applicant: Eric Liao, Taichung (TW)

(72) Inventor: Eric Liao, Taichung (TW)

( * ) Notice: Subject to any disclaimer, the term of this patent is extended or adjusted under 35 U.S.C. 154(b) by 0 days.

(21) Appl. No.: 13/751,357

(22) Filed: Jan. 28, 2013

(51) Int. Cl.
*B32B 38/10* (2006.01)
*B26B 13/00* (2006.01)

(52) U.S. Cl.
CPC .............. *B26B 13/00* (2013.01); *Y10S 156/929* (2013.01); *Y10S 156/94* (2013.01)
USPC ..................... 156/761; 15/104.93; 15/104.94; 15/105; 15/111; 15/244.1; 15/219; 156/762; 156/717; 156/929; 156/940; 30/169; 30/172; 30/173; 30/265; 30/276; 30/299; 30/365; 30/366; 401/42; 401/52; 401/119; 401/123; 401/126; 401/129; 401/130; 401/196; 401/207; 401/261; 56/255; 56/295

(58) Field of Classification Search
USPC .......................... 156/762, 717, 761, 929, 940
See application file for complete search history.

(56) References Cited

U.S. PATENT DOCUMENTS

| | | | | | |
|---|---|---|---|---|---|
| 1,070,241 | A | * | 8/1913 | Fischer et al. | 156/714 |
| 1,434,744 | A | * | 11/1922 | Hibbler | 30/169 |
| 1,651,933 | A | * | 12/1927 | Patton | 81/15.2 |
| 4,502,223 | A | * | 3/1985 | Brookfield | 30/365 |
| 5,020,181 | A | * | 6/1991 | Leonard | 15/105 |
| 5,074,045 | A | * | 12/1991 | Brookfield | 30/172 |
| 5,435,064 | A | * | 7/1995 | Brookfield | 30/169 |
| 5,643,403 | A | * | 7/1997 | Poole et al. | 156/762 |

* cited by examiner

*Primary Examiner* — Mark A Osele
*Assistant Examiner* — Nickolas Harm
(74) *Attorney, Agent, or Firm* — Banger Shia

(57) ABSTRACT

An adhesive substance removing tool is provided with a cracking tool and a scrapping assembly which are removably coupled to a base. The cracking tool is used to crack the adhesive substance by forming breaking lines on the surface of the adhesive substance, and then the scrapping assembly is used to scrape off the adhesive substance by starting from the breaking lines. The combination of the cracking tool and the scraping assembly allows the user to remove adhesive substance easily and completely. Besides, the cutting assembly of the cracking tool is able to move freely both in straight-line or circular fashion, and the cracking tool can be prevented from rotating or disengaging once it is positioned in place on the base. Hence, convenience and safety of use can both be assured.

4 Claims, 14 Drawing Sheets

ADHESIVE SUBSTANCE REMOVING TOOL

BACKGROUND OF THE INVENTION

1. Field of the Invention

The present invention relates to an adhesive substance removing tool, and more particularly to an adhesive substance removing tool used in construction projects.

2. Description of the Prior Art

Wallpaper renovation is one of the most common construction projects, which involves removing the old wallpaper and putting up the new wallpaper. As shown in FIGS. 1 and 2, removing old wallpaper requires the use of a cracking tool 10 which includes a handle 11, a plurality of extension arms 12 connected to the end of the handle 11, and a rolling cutter 13 pivoted to each of the extension arms 12 via a pivot 121. The rolling cutters 13 presses and rolls against the wall to break the old wallpaper. However, this conventional cracking tool 10 is only capable of moving in a straight-line fashion.

After the wallpaper is broken, a scrapping tool 20 which is provided with a holding portion 21 and a blade 22, as shown in FIG. 2, is used to scrape off the broken wallpaper and the glue.

It is obvious from the above description that removing the old wallpaper requires the use of both a cracking tool and a scrapping tool, which is quite inconvenient, and moreover, there exists no combination of the two.

The present invention has arisen to mitigate and/or obviate the afore-described disadvantages.

SUMMARY OF THE INVENTION

The primary objective of the present invention is to provide an adhesive substance removing tool which is the combination of a scraping assembly and a cracking tool.

To achieve the above objective, an adhesive substance removing tool in accordance with the present invention comprises: a base, a scrapping assembly and a cracking tool.

The base is formed with an assembling chamber, and an outer periphery of the assembling chamber extends in opposite directions to form a jaw portion and a tail portion.

The assembling chamber includes a bottom surface, an opening and an inner peripheral surface between the bottom surface and the opening, at the bottom surface are formed a guide protrusion and an assistant protrusion, the bottom surface is provided with a first elastic portion around the guide protrusion and a second elastic portion around the assistant protrusion, each of the first and second elastic portions includes two opposite slits and a slot, the slot is in communication with the slits and extends between the bottom surface and the inner peripheral surface, and the two slits penetrate the bottom surface and cooperate with the slot to define a U-shaped gap, so as to make a portion of the bottom surface surrounded by the U-shaped gap elastic, the inner peripheral surface of the assembling chamber is provided with a first threaded section and a second threaded section.

The scrapping assembly includes a blade holder and a blade mounted on the blade holder, and the blade holder is disposed on the jaw portion of the base.

The cracking tool includes a cover and a cutting assembly, the cover is formed with a receiving chamber and a terminal periphery. In the receiving chamber is disposed a center shaft, and around the terminal periphery are formed a first positioning concave and a second positioning concave. On an outer surface of the cover are formed a first helical protrusion and a second helical protrusion, the cutting assembly is provided with a sleeve, a double-cutter shaft and two cutting rollers. The sleeve is provided with an extension arm to pivotally connect the double-cutter shaft, the two cutting rollers are pivotally connected to two ends of the double-cutter shaft, the sleeve is pivotally sleeved onto the center shaft and fixed thereon by inserting the positioning member into the center shaft, and the cutting assembly partially protrudes out of the terminal periphery. After the cutting assembly is positioned on the cover, the first and second helical protrusions of the cover are screwed with the first and second threaded sections of the base, and the guide protrusion and the assistant protrusion of the base are restricted in the first and second positioning concavities of the cover, respectively.

DETAILED DESCRIPTION OF THE PREFERRED EMBODIMENTS

Figure 1:
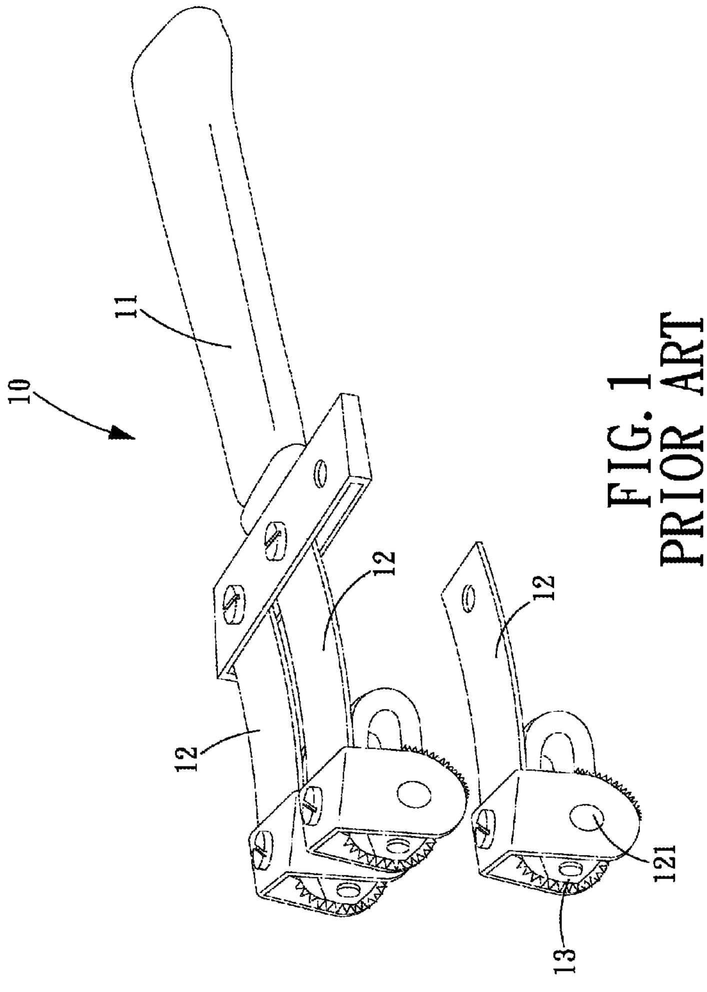
FIG. 1 PRIOR ART
FIG. 1 shows a conventional cracking tool.
Figure 2:
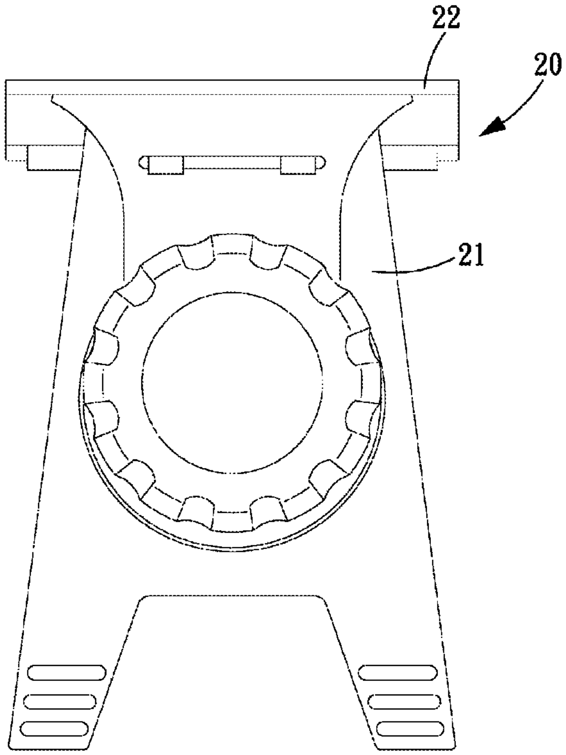
FIG. 2 PRIOR ART
FIG. 2 shows a conventional scraping tool.
Figure 3:
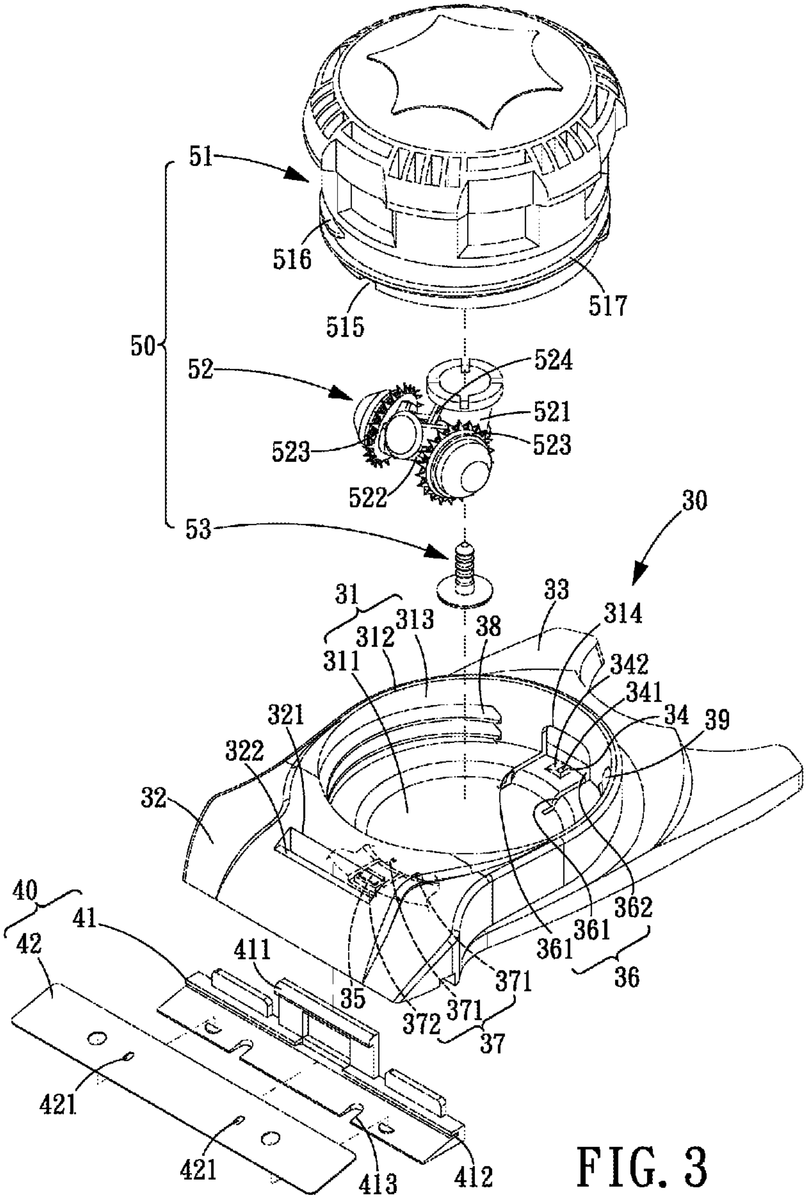
FIG. 3 is an exploded view of an adhesive substance removing tool in accordance with a preferred embodiment of the present invention.
Figure 4:
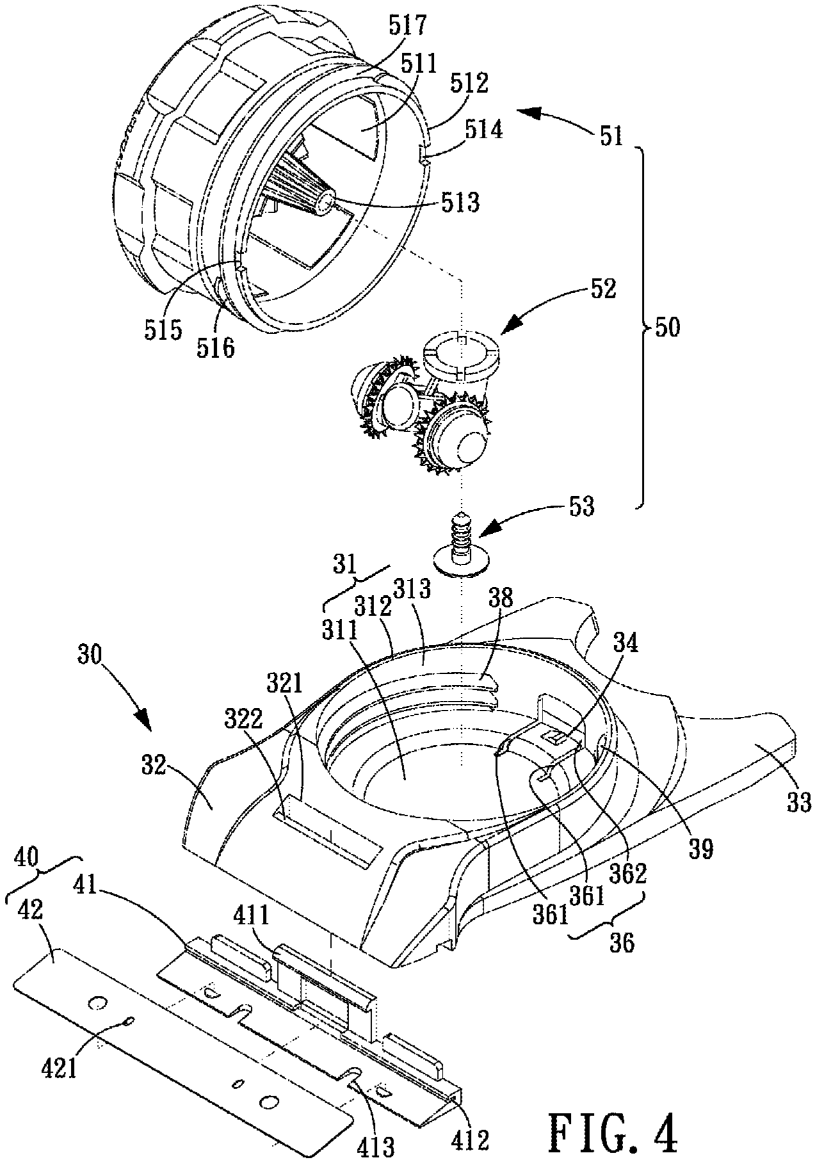
FIG. 4 is another exploded view of an adhesive substance removing tool in accordance with a preferred embodiment of the present invention.
Figure 5:
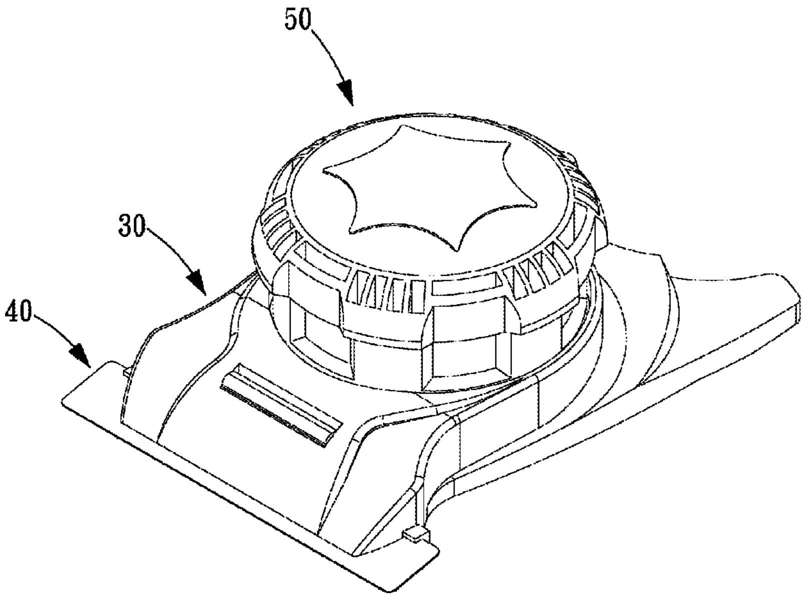
FIG. 5 is an assembly view of the adhesive substance removing tool in accordance with the present invention.

The present invention will be clearer from the following description when viewed together with the accompanying drawings, which show, for purpose of illustrations only, the preferred embodiment in accordance with the present invention.

Referring to FIGS. 3-5 and 11, an adhesive substance removing tool in accordance with a preferred embodiment of the present invention comprises: a base 30, a scrapping assembly 40 and a cracking tool 50.

The base 30 is formed with an assembling chamber 31, and the outer periphery of the assembling chamber 31 protrudes upward to form a jaw portion 32 and a tail portion 33. The assembling chamber 31 includes a bottom surface 311, an opening 312 and an inner peripheral surface 313 between the bottom surface 311 and the opening 312. At the bottom surface 311 are formed a guide protrusion 34 and an assistant protrusion 35. The guide protrusion 34 is trapezoid-shaped and includes a top surface 341 and an oblique surface 342 connected between the top surface 341 and the bottom surface 311. The guide protrusion 34 has a first height H1 which is defined from the top surface 341 to the bottom surface 311. The assistant protrusion 35 is square-shaped and has a second height H2 which is smaller than the first height H1.

The bottom surface 311 is provided with a first elastic portion 36 around the guide protrusion 34 and a second elastic portion 37 around the assistant protrusion 35. The first elastic portion 36 includes two opposite slits 361 and a slot 362, and the slot 362 is in communication with the slits 361 and extends between the bottom surface 311 and the inner peripheral surface 313, and the two slits 361 penetrate the bottom surface 311 and cooperate with the slot 362 to define a U-shaped gap, so as to make the portion of the bottom surface 311 surrounded by the U-shaped gap elastic. Similarly, the second elastic portion 37 includes two opposite slits 371 and a slot 372, the slot 372 is in communication with the slits 371 and extends between the bottom surface 311 and the inner peripheral surface 313, and the two slits 371 penetrate the bottom surface 311 and cooperate with the slot 372 to define a U-shaped gap, so as to make the portion of the bottom surface 311 surrounded by the U-shaped gap elastic. The inner peripheral surface 313 of the assembling chamber 31 is formed with a gap 314 in communication with the slot 362 of the first elastic portion 36 and further provided with a first threaded section 38 and a second threaded section 39. The jaw portion 32 includes an assembling slot 321 in which are formed a restricting shoulder portion 322 and a plurality of restricting protrusions 323.

The scrapping assembly 40 includes a blade holder 41 and a blade 42. The blade holder 41 includes a positioning hook 411, a positioning groove 412 and a plurality of concavities 413. The positioning hook 411 of the blade holder 41 is movably disposed in the assembling slot 321 of the jaw portion 32 of the base 30 and stopped against the shoulder portion 322. The blade 42 is formed with a plurality of apertures 421 and inserted in the positioning groove 412 in such a manner that the apertures 421 of the blade 42 are aligned with the concavities 413 of the blade holder 41, and the restricting protrusions 323 of the jaw portion 32 are inserted through the apertures 421 of the blade 42 and the concavities 413 of the blade holder 41, so that the blade 42 is fixed to the blade holder 41, and the blade holder 41 is fixed to the jaw portion 32 of the base 30.

The cracking tool 50 includes a cover 51, a cutting assembly 52 and a positioning member 53. The cover 51 includes a receiving chamber 511 and a terminal periphery 512. In the receiving chamber 511 is disposed a center shaft 513, and around the terminal periphery 512 are formed a first positioning concave 514 and a second positioning concave 515. Around the outer surface of the cover 51 are formed a first helical protrusion 516 and a second helical protrusion 517. The cutting assembly 52 includes a sleeve 521, a double-cutter shaft 522 and two cutting rollers 523. The sleeve 521 is provided with an extension arm 524 to pivotally connect the double-cutter shaft 522, and the two cutting rollers 523 are pivotally connected to two ends of the double-cutter shaft 522. The sleeve 521 is pivotally sleeved onto the center shaft 513 and fixed thereon by inserting the positioning member 53 into the center shaft 513, and the cutting assembly 52 partially protrudes out of the terminal periphery 512. After the cutting assembly 52 is positioned on the cover 51, the first and second helical protrusions 516, 517 of the cover 51 are screwed with the first and second threaded sections 38, 39 of the base 30, and finally, the guide protrusion 34 and the assistant protrusion 35 of the base 30 are restricted in the first and second positioning concavities 514, 515 of the cover 51, respectively.

Figure 6:
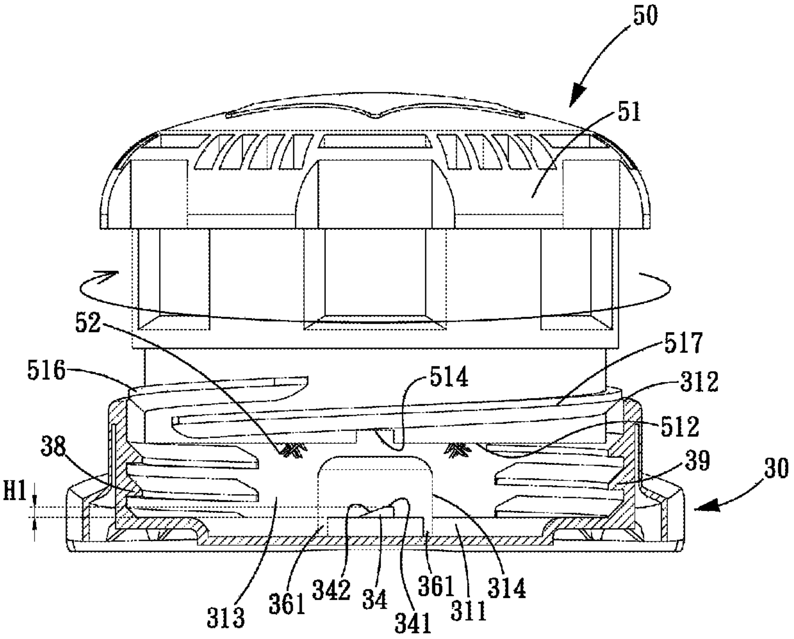
FIG. 6 is a partial cross sectional view of the adhesive substance removing tool in accordance with the present invention.
Figure 7:
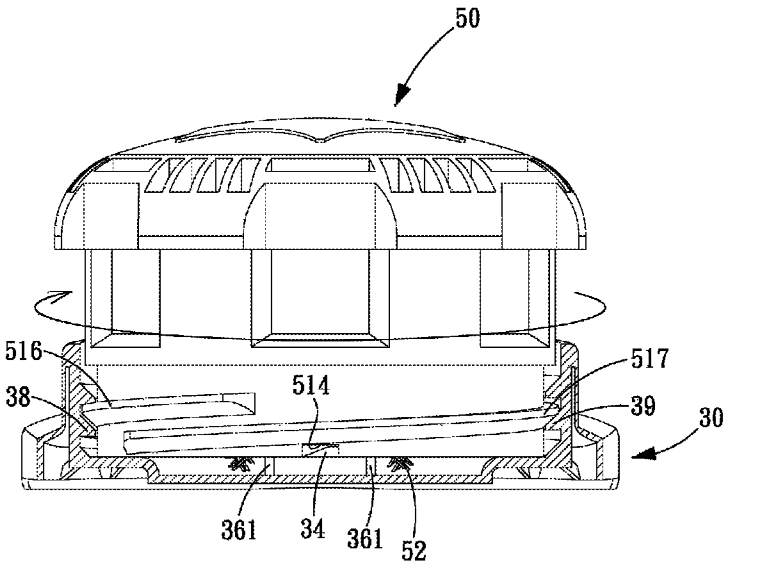
FIG. 7 is another partial cross sectional view of the adhesive substance removing tool in accordance with the present invention.
Figure 8:
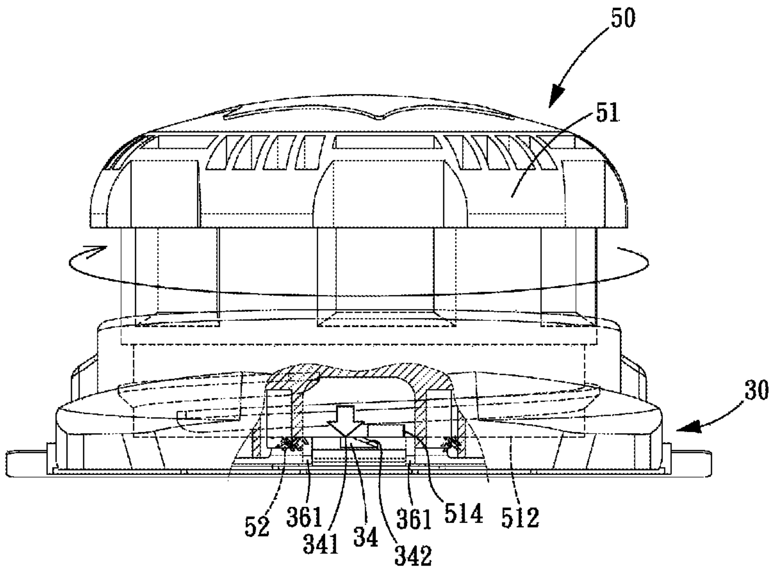
FIG. 8 is another partial cross sectional view of the adhesive substance removing tool in accordance with the present invention.
Figure 9:
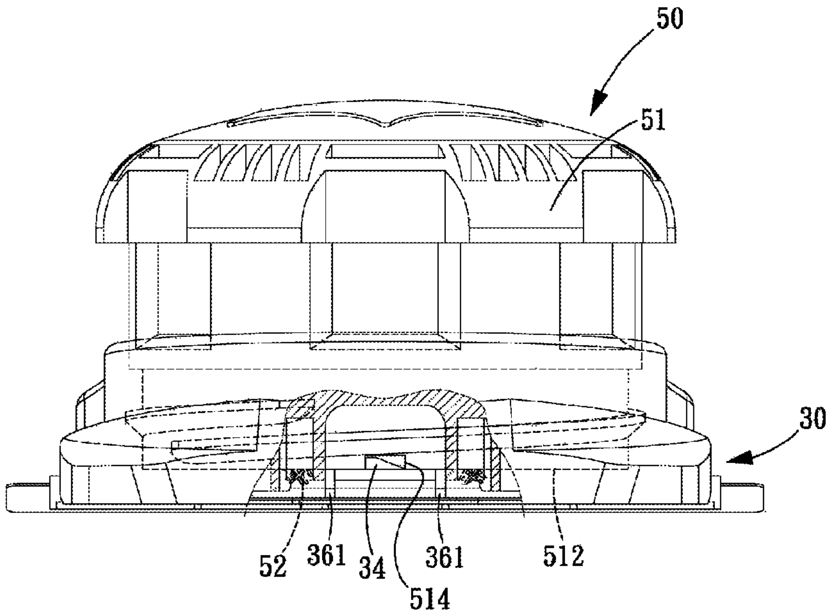
FIG. 9 is another partial cross sectional view of the adhesive substance removing tool in accordance with the present invention.
Figure 10:
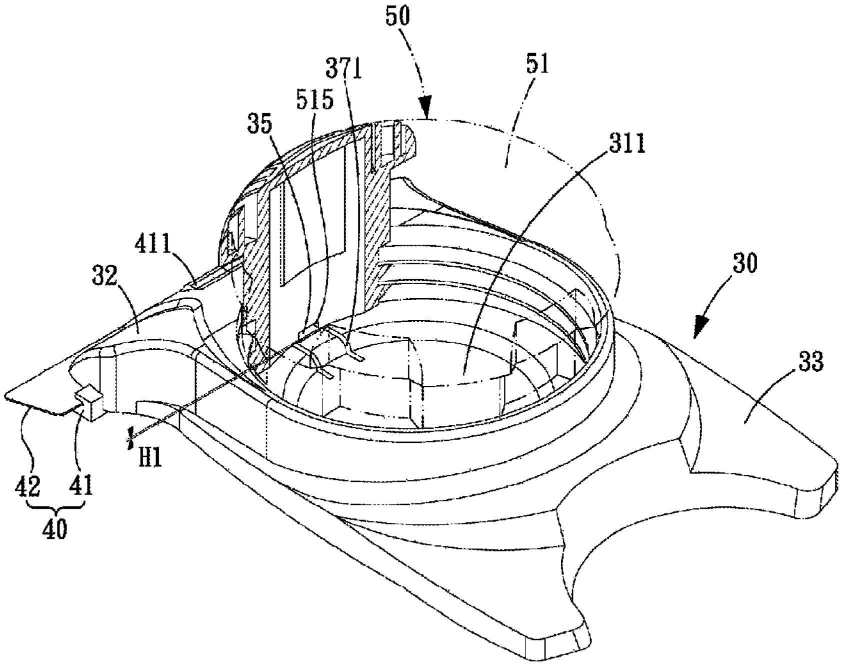
FIG. 10 is another partial perspective view of the adhesive substance removing tool in accordance with the present invention.
Figure 11:
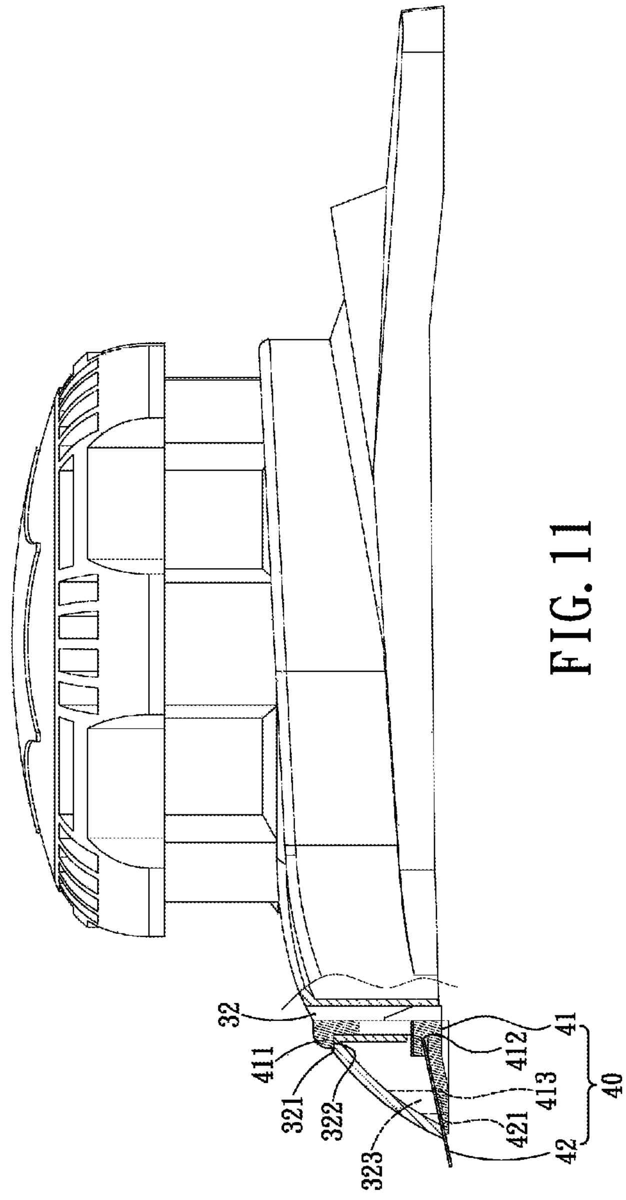
FIG. 11 shows another partial cross sectional view of the adhesive substance removing tool in accordance with the present invention.

The cracking tool 50 can be fixed to or removed from the base 30 as desired by rotating the cover 51. To fix the cracking tool 50 onto the base 30, as shown in FIGS. 6-10, the cover 51 is firstly placed in the assembling chamber 31 of the base 30, as shown in FIG. 6, then the cover 51 is rotated to make the first and second helical protrusions 516, 517 of the cover 51 screwed with the first and second threaded sections 38, 39 of the base 30, as show in FIG. 7. Then the cover 51 is rotated further into the assembling chamber 31 until the terminal periphery 512 of the cover 51 is brought into contact with the top surface 341 of the guide protrusion 34 (as shown in FIG. 8) and the assistant protrusion 35, at this moment, the first and second elastic portions 36, 37 will be elastically deformed to push the guide protrusion 34 and the assistant protrusion 35 to move downward. Then, the cover 51 is continuously rotated until the first and second positioning concavities 514, 515 of the cover 51 are aligned with the guide protrusion 34 and the assistant protrusion 35 of the base 30, respectively, the first and second elastic portions 36, 37 will recover and elastically push the guide protrusion 34 and the assistant protrusion 35 into the first and second positioning concavities 514, 515, respectively, as shown in FIGS. 9 and 10, so that the cover 51 is stopped from further rotating and consequently fixed.

To remove the cover 51 from the base 30, it only needs to rotate the cover 51 reversely, and the rotation force of the cover 51 will be transferred to the first and second elastic portions 36, 37 via the guide protrusion 34 and the assistant protrusion 35 to make the first and second elastic portions 36, 37 deform, so that the guide protrusion 34 and the assistant protrusion 35 can be disengaged from the first and second positioning concavities 514, 515, and consequently, the cover 51 can be further rotated to disengage from the base 30.

In addition, the blade 42 of the present invention can be easily replaced by pushing the blade holder 41 downward from the assembling slot 321 to make the blade holder 41 disengage from the restricting shoulder portion 322, so that the blade 42 can be replaced and removed from the blade holder 41 when the blade holder 41 is disengaged from the restricting shoulder portion 322.

Figure 12:
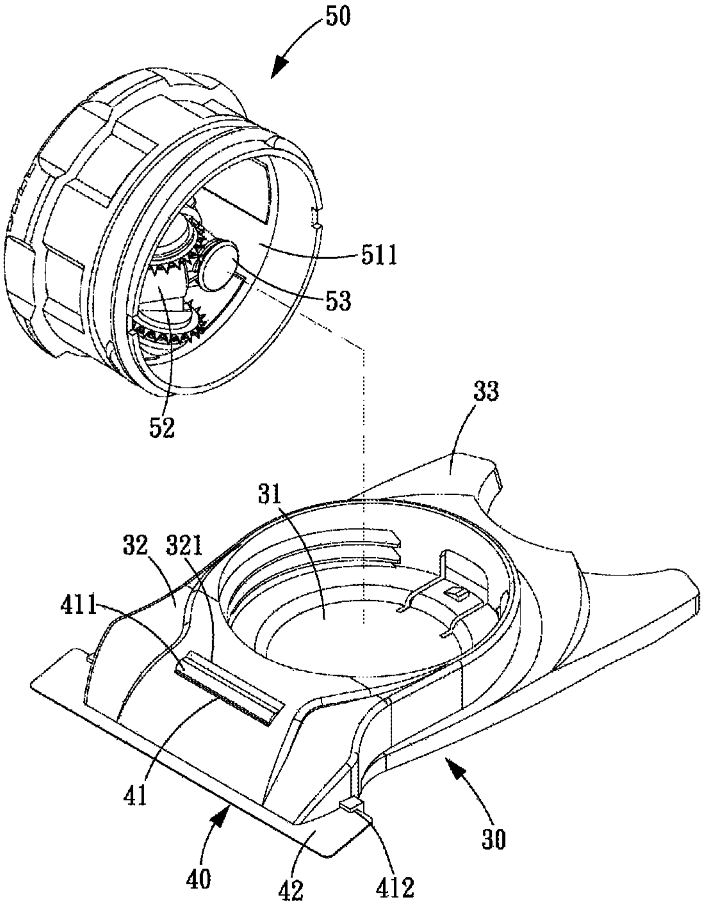
FIG. 12 shows that the cracking tool is disassembled from the base of the adhesive substance removing tool in accordance with the present invention.
Figure 13:
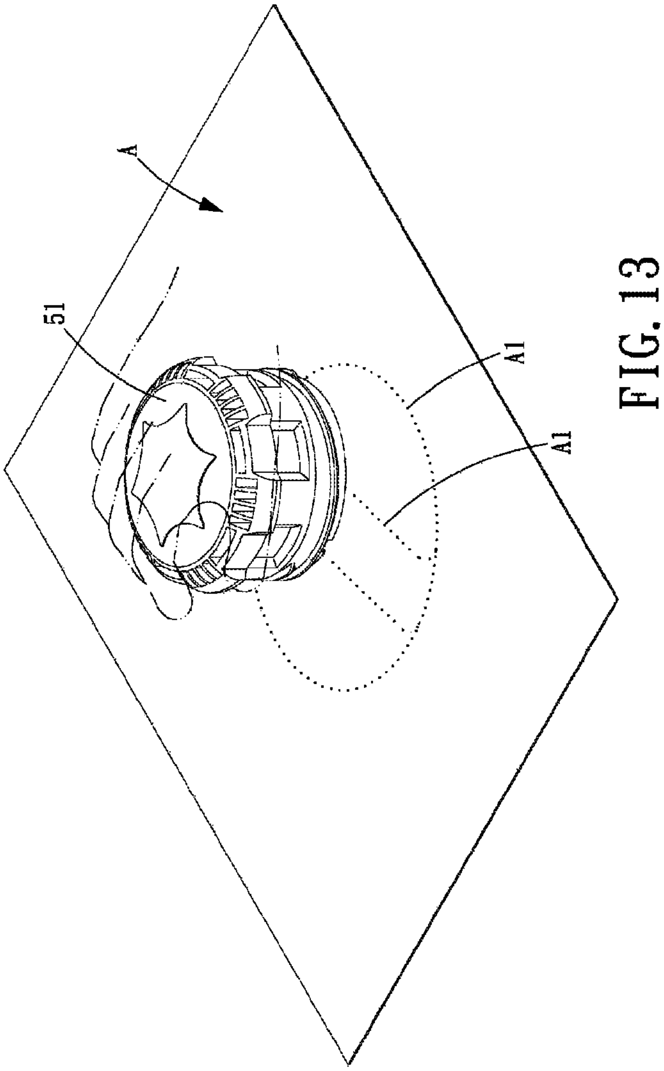
FIG. 13 shows that the adhesive substance removing tool in accordance with the present invention is used to crack the adhesive substance by forming breaking lines.

As shown in FIG. 12, to remove adhesive substance, the user can firstly remove the cracking tool 50 from the base, then holds cover 51 while pressing the cutting assembly 52 against the adhesive substance A. Since the cutting assembly 52 is pivoted to the center shaft 513 by the sleeve 521, and the cutting rollers 523 are pivoted to the double-cutter shaft 522, which allows the cover 51 to be pushed to move in linear or circular fashion, as shown in FIG. 13, and the breaking lines A1 will be formed on the adhesive substance A along the path that the cutting assembly 52 traveled.

Figure 14:
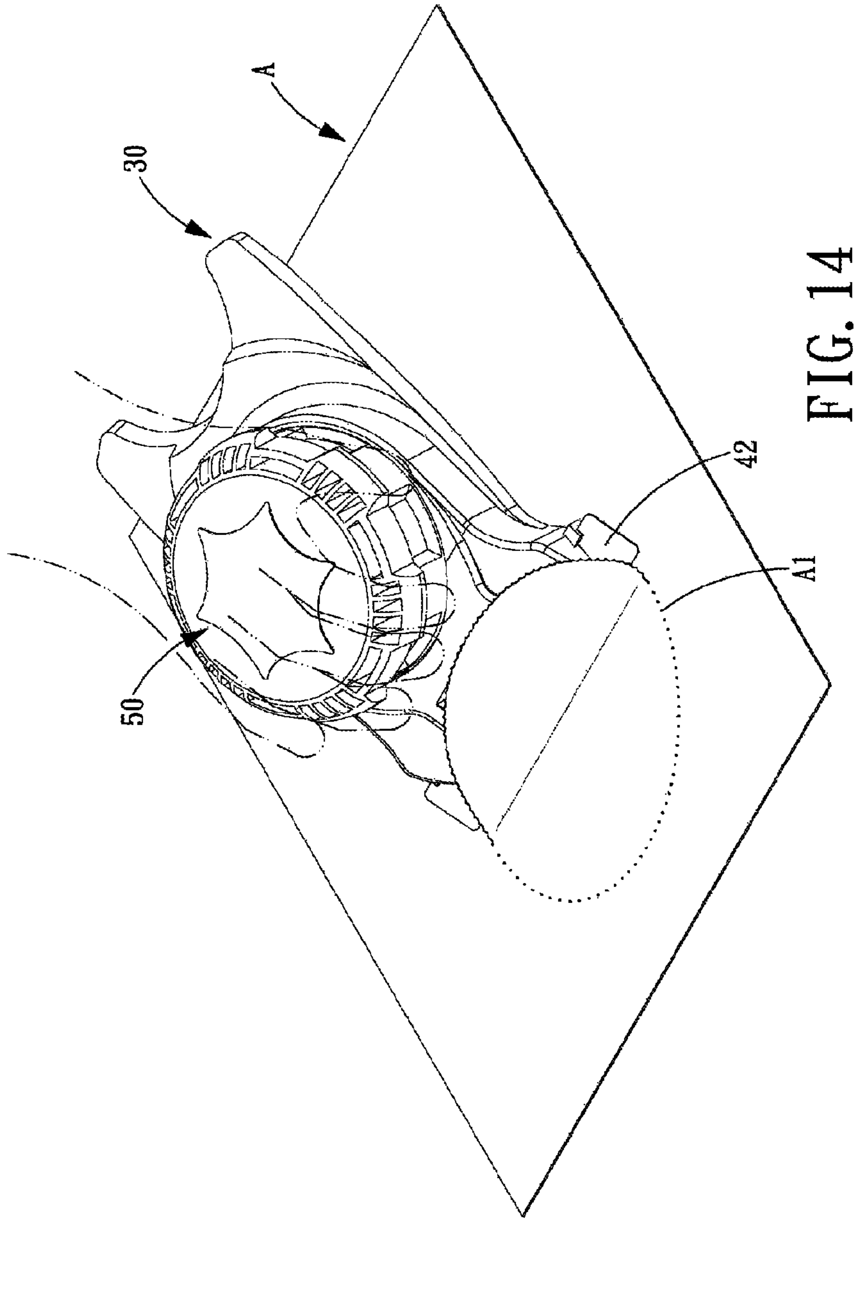
FIG. 14 shows that the adhesive substance removing tool in accordance with the present invention is used to scrape off the adhesive substance by starting from the breaking lines.

After the adhesive substance A is completely broken by the cutting assembly 52, the user can hold the base 30 and use the blade 42 of the scrapping assembly 40 provided on the jaw portion 32 of the base 30 to scrape off the adhesive substance A by starting from the breaking lines A1, as shown in FIG. 14. When removing the adhesive substance A, the user can hold the base 30 alone or can fix the cracking tool 50 onto the base 30 and then hold the base 30.

In general, the combination of the cracking tool 50 which is capable of breaking the adhesive substance A and the scraping assembly 40 which is capable of scraping off the adhesive substance A allows the user to remove adhesive substance A easily and completely. Besides, the cutting assembly 52 of the cracking tool 50 is able to move freely both in straight-line or circular fashion, the cracking tool 50 and the scraping assembly 40 can be firmly positioned on the base 30, and the cracking tool 50 can be prevented from rotating or disengaging once it is positioned in place on the base 30. Hence, convenience and safety of use can both be assured.

While we have shown and described various embodiments in accordance with the present invention, it is clear to those skilled in the art that further embodiments may be made without departing from the scope of the present invention.

What is claimed is:

1. An adhesive substance removing tool comprising:

a base formed with an assembling chamber, and an outer periphery of the assembling chamber protruding upward to form a jaw portion and a tail portion; wherein the assembling chamber includes a bottom surface, an opening and an inner peripheral surface between the bottom surface and the opening, at the bottom surface are formed a guide protrusion and an assistant protrusion, the bottom surface is provided with a first elastic portion around the guide protrusion and a second elastic portion around the assistant protrusion, each of the first and second elastic portions includes two opposite slits and a slot, the slot is in communication with the slits and extends between the bottom surface and the inner peripheral surface, the two slits penetrate the bottom surface and cooperate with the slot to define a U-shaped gap, so as to make a portion of the bottom surface surrounded by the U-shaped gap elastic, the inner peripheral surface of the assembling chamber is provided with a first threaded section and a second threaded section;

a scrapping assembly including a blade holder and a blade mounted on the blade holder, and the blade holder being disposed on the jaw portion of the base; and a cracking tool including a cover and a cutting assembly, the cover being formed with a receiving chamber and a terminal periphery, in the receiving chamber being disposed a center shaft, and around the terminal periphery being formed a first positioning concave and a second positioning concave, on an outer surface of the cover being formed a first helical protrusion and a second helical protrusion, the cutting assembly being provided with a sleeve, a double-cutter shaft and two cutting rollers, the sleeve being provided with an extension arm to pivotally connect the double-cutter shaft, the two cutting rollers being pivotally connected to two ends of the double-cutter shaft, the sleeve being pivotally sleeved onto the center shaft and fixed thereon by inserting the positioning member into the center shaft, and the cutting assembly partially protruding out of the terminal periphery, after the cutting assembly is positioned on the cover, the first and second helical protrusions of the cover are screwed with the first and second threaded sections of the base, and the guide protrusion and the assistant protrusion of the base are restricted in the first and second positioning concavities of the cover, respectively.

2. The adhesive substance removing tool as claimed in claim 1, wherein the guide protrusion is trapezoid-shaped and includes a top surface and an oblique surface connected between the top surface and the bottom surface, the guide protrusion has a first height which is defined from the top surface to the bottom surface, and the assistant protrusion has a second height which is smaller than the first height.

3. The adhesive substance removing tool as claimed in claim 1, wherein the jaw portion includes an assembling slot and a restricting shoulder portion and a plurality of restricting protrusions are formed in the assembling slot, the blade holder includes a positioning hook, a positioning groove and a plurality of concavities, the positioning hook of the blade holder is movably disposed in the assembling slot of the jaw portion of the base, the blade is formed with a plurality of apertures and inserted in the positioning groove in such a manner that the apertures of the blade are aligned with the concavities of the blade holder, and the restricting protrusions of the jaw portion are inserted through the apertures of the blade and the concavities of the blade holder.

4. The adhesive substance removing tool as claimed in claim 1 further comprising a positioning member inserted in the center shaft to fix the sleeve and the double-cutter shaft.

* * * * *